Feb. 6, 1940.   J. J. DILKS, JR   2,188,974
CAMERA
Filed March 20, 1939   3 Sheets-Sheet 1
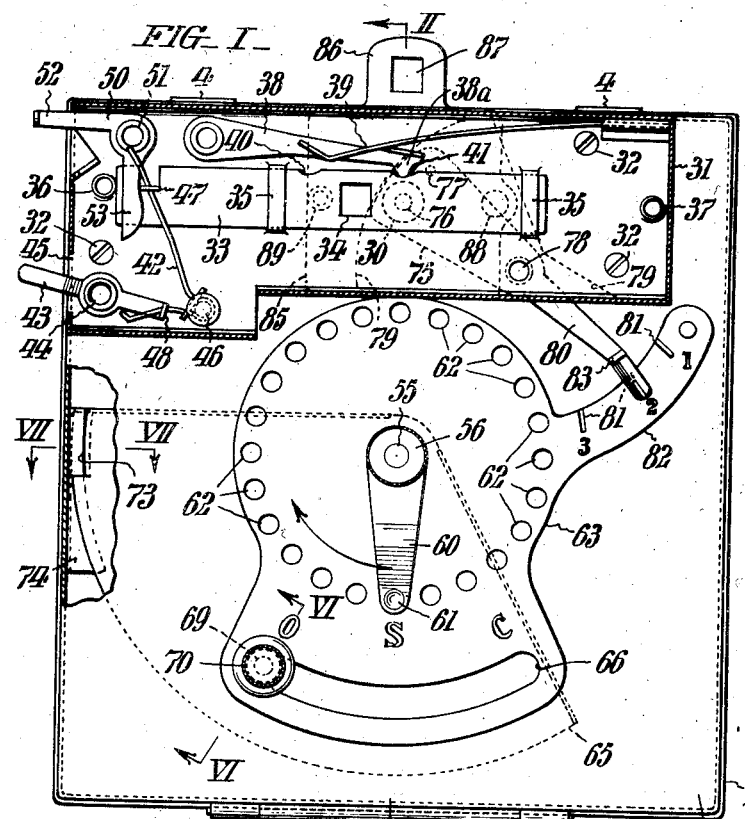
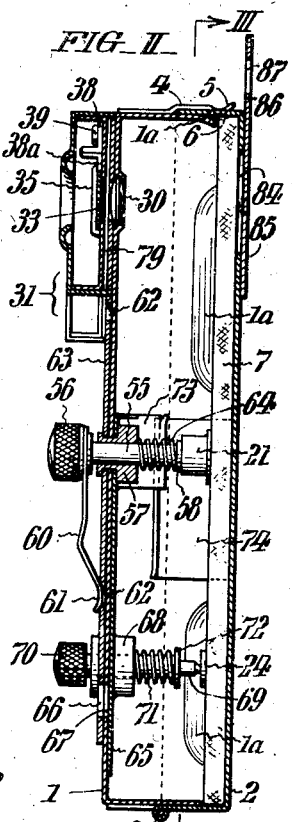
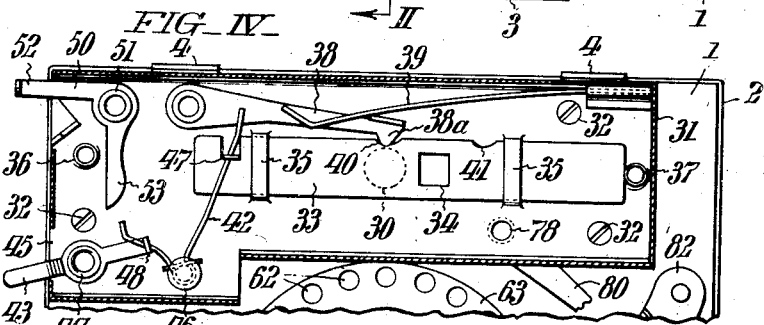
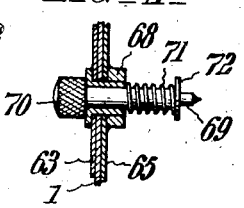
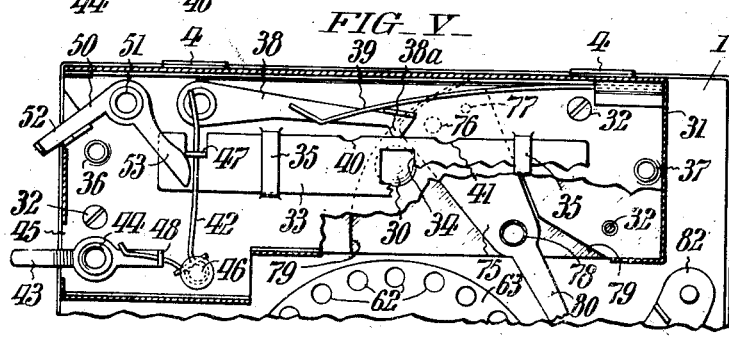
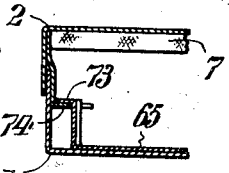
INVENTOR:
James J. Dilks, Jr.,
BY Paul & Paul
ATTORNEYS.

Feb. 6, 1940.   J. J. DILKS, JR   2,188,974
CAMERA
Filed March 20, 1939   3 Sheets-Sheet 2
FIG. III
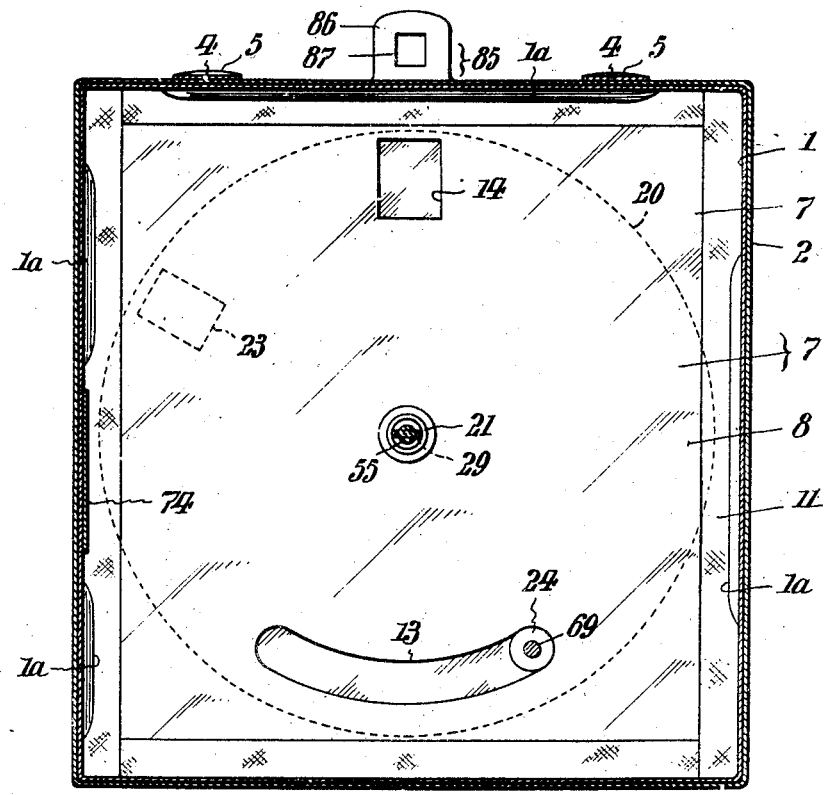
FIG. VIII
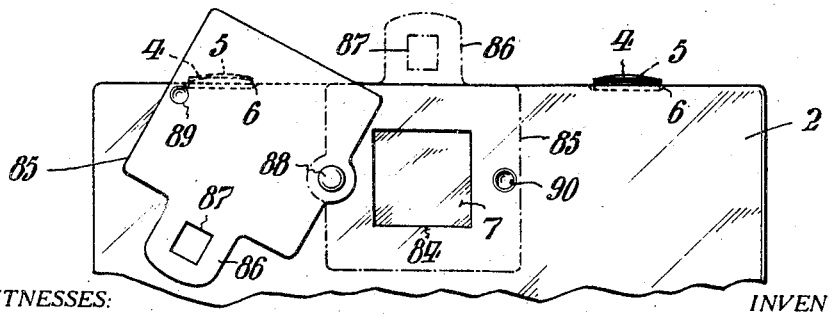
WITNESSES:
Hubert Fuchs
George L. Comly
INVENTOR:
James J. Dilks, Jr.,
BY Paul & Paul
ATTORNEYS.

Feb. 6, 1940. J. J. DILKS, JR 2,188,974
CAMERA
Filed March 20, 1939  3 Sheets-Sheet 3
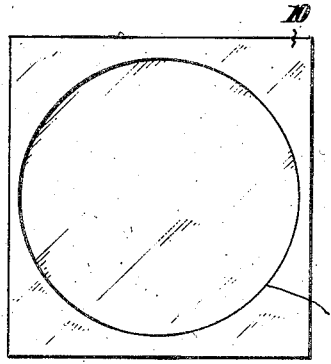
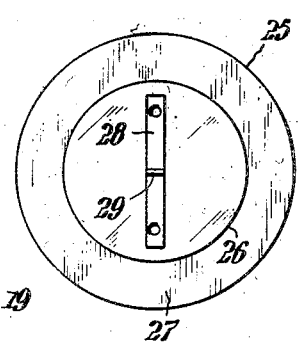
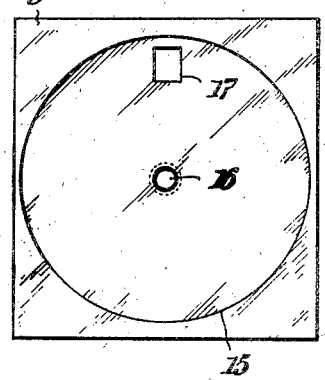
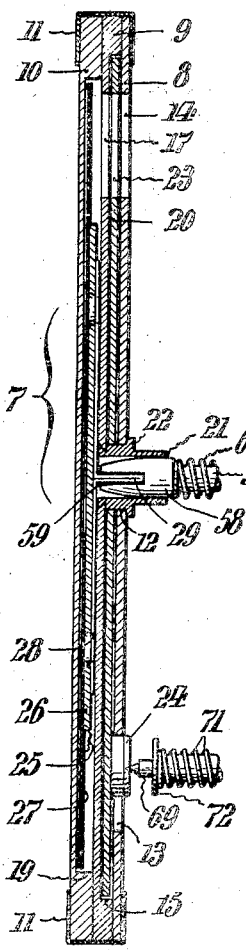
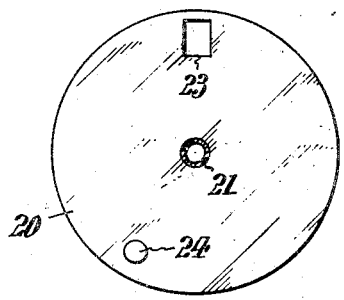
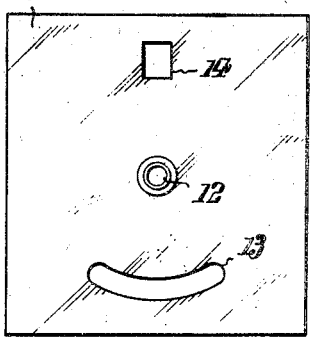
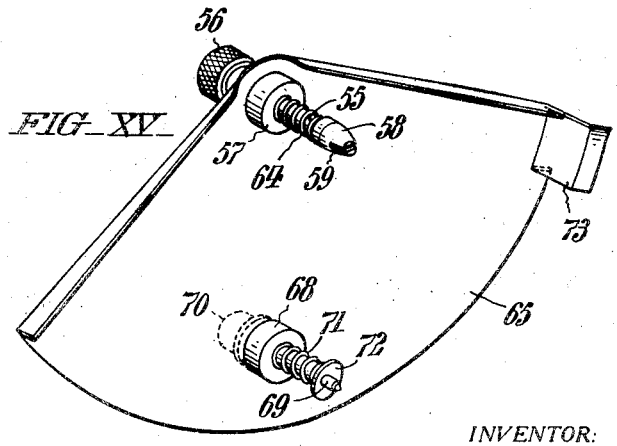
INVENTOR:
James J. Dilks, Jr.,
BY
ATTORNEYS.

Patented Feb. 6, 1940

2,188,974

UNITED STATES PATENT OFFICE 2,188,974

CAMERA

James J. Dilks, Jr., Haddon Heights, N. J.

Application March 20, 1939, Serial No. 262,803

19 Claims. (Cl. 95—38)

This invention relates to cameras, and has reference more specifically to cameras designed for use in connection with disk films.

The chief aim of my invention is to improve and structurally simplify cameras of the type referred to with a view toward making daylight loading possible; minimizing complications for more ready and easier manipulation, with attainment of excellent results, by amateurs and others not especially skilled in photography; and moreover enabling their production in quantity at a much lower cost than heretofore.

Other objects and attendant advantages of my invention will appear from the following detailed description of the attached drawings, wherein Fig. I is a view partly in front elevation and partly in vertical section, of a camera conveniently embodying the present improvements.

Fig. II is a cross section taken as indicated by the angled arrows in Fig. I.

Fig. III is a vertical section taken as indicated by the angled arrows III—III in Fig. II.

Figs. IV and V are fragmentary views corresponding to Fig. I and showing the lens shutter of the camera in different positions.

Figs. VI and VII are fragmentary detail sections taken as indicated respectively by the angled arrows VI—VI and VII—VII in Fig. I.

Fig. VIII is a fragmentary view showing the upper portion of the back of the camera.

Fig. IX shows in cross section a film magazine adapted for use in my improved camera.

Figs. X—XIV are separate illustrations of different parts which enter into the construction of the film magazine; and Fig. XV is a perspective view of a movable shield member associated with the camera.

As shown in Figs. I and II, the casing of my improved camera is square and flat, and consists of two perimetrically flanged opposingly-arranged components 1 and 2 which are connected together at the bottom in the medial plane of said casing by a hinge 3. From Fig. II it will be noted that the rear casing component 2 engages over the front component 1 with a light tight fit, and is held closed by spring clips 4 which are secured to the front component at the top and have roundings 5 at their free ends yieldingly engaging depressions 6 in the top of the rear component.

Proportioned to fit snugly into the rear casing component 2 and adapted to be held in place therein by inwardly offset portions 1a of the perimetric flange of the front component 1 when the camera is closed, is a flat film envelope or magazine 7, see Figs. II, III and IX. In the present instance, the magazine 7 is formed of three square sections 8, 9 and 10 which are separately illustrated respectively in Figs. X, XI and XII and which may be of cardboard or other suitably stiff sheet material superimposed one upon the other and bound together by adhesive tape 11. The section 8 constituting the front wall of the magazine 7 is provided for purposes presently explained with a circular hole 12 at the center and a concentric slot 13 adjacent its bottom edge, as well as with a rectangular exposure opening 14 adjacent its top edge. The intermediate or partition section 9 of the magazine has a circular depression 15 in its front face, and is moreover provided with a central circular hole 16, and also with an exposure opening 17 to correspond with those of the front section 8. The back wall section 10 of the magazine has but a circular depression 19 in its front face whereof the diameter is somewhat less than that of the recess 15 in the section 9. Disposed within the circular hollow formed within the magazine 7 by the recess 15 in the section 9 is a closure disk 20 which is separately illustrated in Fig. XIII and which is rotatively shiftable about a bushing 21 having the portion rearward of its circumferential stop flange 22 extending through the central holes 12 and 16 of the sections 8 and 9 as shown in Fig. IX, the reduced inner end of said bushing being peened over against the back of the last mentioned section. Adjacent its top, the disk 20 is provided with a rectangular exposure aperture 23 which is radially positioned to correspond with the exposure openings 14 and 17 of the sections 8 and 9, and adjacent its bottom with a button 24 adapted to project forwardly through the arcuate slot 13 in the section 8. The circular compartment set apart in the rear of the magazine 7 by the recess 19 in the back section 10 is occupied by a sensitized film disk 25 (Fig. XIV) to which is centrally affixed a stiffening disk 26 of cardboard whereof the diameter is such as to leave uncovered a circumferential surface margin 27 of said film disk for exposure at the aligned openings 14, 17 of the sections 8 and 9. To the film reinforcing disk 26 is in turn secured a diametral strip 28 of metal with a central key projection 29 which extends forwardly into the bushing 21 as shown in Fig. IX.

With the magazine 7 in place within the camera, the exposure openings 14, 17 are in line with a suitable objective lens 30 set into the front casing component 1.

The shutter mechanism of the camera is enclosed within a horizontally elongate housing 31, which, in the illustrated instance, is separately formed and secured crosswise of the front of the casing component 1 by screws 32. The shutter mechanism includes a horizontal slide 33 of thin sheet metal material with a square exposure opening 34 which is normally out of registry with the lens 30 in either of the positions shown in Figs. I and IV. The shutter slide 33 is guided for endwise movement by forwardly displaced straps 35 punched out of the back wall of the shutter housing 31, and is limited in its movement by fixed end stops 36, 37 likewise punched out of said wall. A pivoted finger 38 subject to a leaf spring 39 and having a cam projection 38a to cooperate with spaced notches 40 and 41 in the top edge of the shutter slide 33, serves to yieldingly hold the latter against accidental displacement in shifted positions. The slide 33 is operable through the medium of a double arm spring element 42, by means of a finger lever 43 which is fulcrumed at 44 within the shutter housing 31 and which projects outward through a slot 45 in the lefthand end (Figs. I–III) of said housing. The spring element 42 is free to swing about a fixed fulcrum stud 46, one of its arms being engaged in a laterally projecting ear 47 on the slide 33 and its other arm with an ear 48 on the shutter operating lever 43. By moving the lever 43 from the position of Fig. I to the position of Fig. IV, energy is initially stored in the spring element 42 and when this becomes sufficiently potent to overcome the frictional restraint imposed by the finger 38 upon the slide 33, the latter will be suddenly moved rightward until arrested by the end stop 37, with the result that the lens 30 is momentarily uncovered for a "snapshot" exposure. In a similar way, by moving the lever 42 upward in Fig. IV, the shutter slide 33 will be shifted to the left and restored to the position shown in Fig. I. In order that time exposures may be made with the camera, I have provided an auxiliary stop element in the form of a bell crank lever 50 which is movable about a friction pivot 51 within the shutter housing 31 and which has the manipulating arm 52 projecting out through another opening in the lefthand end of said housing. When the lever 50 is moved from the normal position of Figs. I and IV to the position of Fig. V, its other arm 53, by cooperation with the ear 47 on the shutter slide 33, causes said slide to be shifted rightward, the permissible extent of movement of said lever determining registry of the aperture 34 of the slide with the lens 30 as in Fig. V. In this action, the longer arm of the spring element 42 is flexed and upon restoration of the lever 50 to its normal position at the end of the desired exposure period, automatically shifts the shutter slide reversely to cover the lens 30.

For the purpose of enabling the photographing of successive pictures on the circumferential surface zone or margin 27 of film disk 25, I have further provided means whereby said disk may be rotatively shifted from the exterior of the camera. This means includes a spindle 55 which has a knurled manipulating knob 56 at its outer end, and which extends inward through a bearing 57 fixed in the wall of the front casing component 1. At its inner end, the spindle 55 is provided with a head 58 which, see Fig. IX, is tapered for capacity to freely enter the outer end of the bushing 21 on the magazine 7 as the camera is closed after loading. As shown, the head 58 has a diametral slot 59 for engaging the key projection 29 on the film disk 25. Secured to the spindle 55 immediately behind the manipulating knob 56 is a finger 60 having a spoon end 61 which is adapted to successively engage holes 62 arranged in circular series in an index dial 63 at the front of the casing component 1, concentrically with the spindle axis. A coiled spring 64 in compression between the rear of the bearing 57 and the head 58 on the spindle 55 operates to keep the finger 60 yieldingly engaged with the holes in the index dial 63. The spacing of the holes 62 is such as to determine pictures in close contiguity around the circumferential exposure zone or margin 27 of the film disk 25 so that economic use is made of the film surface. Fulcrumed for movement about the bearing 57 within the camera is a sector plate 65, see Figs. I, II and XV, which acts as a light seal or shield behind registering arcuate slots 66 and 67 respectively in the wall of the front casing component 1 and in the index dial 63, said slots corresponding in position and in extent with the arcuate slot 13 in the front wall section 8 of the film magazine 7. Set into the shield sector 65 is a sleeve 68 which extends through the registering slots 66, 67 in the casing component 1 and the index plate 63, and which serves as a bearing for a pin 69 (Figs. I, II, VI, IX and XV) having a finger knob 70 at its outer end. The inner end of the pin 69 is pointed to partially penetrate the button 24 on the disk 20 of the magazine 7 as shown in Fig. IX, such engagement being maintained by a helical spring 71 in compression between the inner end of the sleeve 68 and a collar 72 on said pin, see Figs. VI and XV.

In loading the camera, the closure disk 20 of the film magazine 7 is in the position shown in Fig. III with the exposure aperture 14 covered, and the knob 70 placed at the righthand end of the arcuate slot 66 in the index dial 63. Accordingly, upon closing the camera, the pin 69 will automatically engage the button 24 of the magazine disk 20, the spring 71 being slightly compressed incidentally to subsequently maintain such engagement with surety. With this accomplished, the camera is placed in condition for picture taking by shifting the knob 70 to the lefthand end of the slot 66 in the index dial 63 with concurrent rotative shifting of the disk 20 in the film magazine 7 and registering of its opening 23 with the exposure opening 14 in the front wall of said magazine. The letters "O" and "C" adjacent the opposite ends of the slot in the index dial indicate the "open" and "closed" position of the knob 70, while the letter "S" indicates the starting position for the index finger 60.

In order to prevent opening of the camera when the knob 70 is in open position, the sector shield 65 is formed with a segmental flange extension 73 which overlaps and locks with an inward projection 74 (Figs. I and II) on the rear component 2 of the camera, the extent of said projection being such as to be cleared by the extension 73 when the knob 70 is in its fully closed position.

The sharpness of the pictures taken with the camera is controllable by means of a member 75 having lens apertures of different sizes—in the present instance two, designated 76, 77—said apertures being aranged in an arc which intersects the axis of the lens and which has its center in a fulcrum stud 78 whereon the aperture member is pivoted. Between the front of the camera component 1 and the back of the shutter housing 31 is formed a recess 79 to accommodate the aperture member 75 which latter is formed with a spring finger 80 adapted to register yieldingly with numbered stops 81 on an arcuate spur of the index dial 63 in concentric relation to the pivot 78. As shown, the finger 80 has a grasp projection 83 for convenience of manipulation by the fingers.

At the back, the camera casing is provided with a window 84, see Figs. II and VIII which is normally closed by a cover plate 85 having an upward extension 86 with a "finder" opening therein. The cover plate 85 is swingable about a rivet 88 at one side of the window 84 and is yieldingly held in closed position through engagement of a spot projection 89 adjacent its swinging edge with an indentation 90 in the rear wall of the camera casing at the opposite side of said window. The purpose of the provisions just described is to facilitate the removal of the magazine 7 after all of the available surface of the film disk has all been utilized, by thrusting a finger through the window 84 upon pushing aside the cover 85.

As an alternative, the dial 63 may be dispensed with as a separate element, and the stops 62 and 81 formed as indentations in the front wall of the camera casing if this construction should be found more desirable in practice.

From the foregoing it will be seen that by virtue of its simplicity, my improved camera lends itself to ready manufacture as a small compact structure at small cost, and moreover that it is equally simple in its operation and therefore particularly suited for use by amateurs.

Having thus described my invention, I claim:

1. In combination, a magazine enclosing a sensitized film disk, said magazine having an exposure opening in its front wall radially disposed to correspond with a circumferential surface zone of the film on which the pictures are to be successively taken; and a camera with a casing for receiving the magazine, a lens in line with the exposure opening in the magazine, a lens shutter, and means operable from the exterior of the casing whereby the film disk may be rotatively shifted in the magazine for presentation for different portions of its circumferential zone at the exposure aperture.

2. The combination of a film magazine and a camera according to claim 1, wherein the magazine is provided with a shiftable closure which normally covers the exposure opening; and wherein the camera is provided with means also operable from the exterior of its casing, whereby the closure of the magazine may be operated to uncover the exposure opening.

3. In combination, a magazine enclosing a sensitized film disk, said magazine having an exposure opening in its front wall radially disposed to correspond with a circumferential surface zone of the film on which pictures are to be successively taken and a projection rotatable in the front wall and connecting axially with the film disk; and a camera with a casing for receiving the film magazine, a lens in line with the exposure opening in the magazine, a lens shutter, and means operable from the exterior of the casing and engageable with the projection of the magazine whereby the film disk may be rotatively shifted for presentation of different portions of its circumferential zone at the exposure aperture.

4. The combination of a film magazine and a camera according to claim 3, wherein the magazine is provided with a shiftable closure which normally covers the exposure opening; and wherein the camera is provided with means also operable from the exterior whereby the closure of the magazine may be shifted to uncover the exposure opening.

5. The combination of a film magazine and a camera according to claim 3, wherein the magazine is provided with a discous closure independently mounted coaxially with the film disk and having an opening normally out of register with the exposure opening; and wherein the camera is provided with means also operable from the exterior whereby the closure of the magazine may be shifted to uncover the exposure opening.

6. The combination of a film magazine and a camera according to claim 3, wherein the magazine is provided with a shiftable closure which normally covers the exposure opening; wherein the camera is provided with means also operable from the exterior whereby the closure of the magazine may be shifted to uncover the exposure opening; wherein the camera casing is formed of two separable components; and wherein a means connected to and operable by the closure shifting means automatically locks the casing components against separation when said closure is moved to uncover the exposure opening.

7. The combination of a film magazine and a camera according to claim 3, wherein the camera casing has a perimetrically flanged rear component and a front component with perimetric flanges fitting within the rear component; wherein the magazine fits snugly into the back component and is held in position therein by the flanges of the front component.

8. The combination of a film magazine and a camera according to claim 3, wherein the camera casing is flat and square and composed of opposing front and rear components which are hingedly connected along one side, the rear component having flanges along its other three sides adapted to fit over similarly allocated flanges on the front component; and wherein the film magazine fits snugly within the rear casing component and is held in place by the flanges of the front casing component.

9. In combination, a magazine enclosing a sensitized film disk, said magazine having an exposure opening in its front wall radially disposed to correspond with a circumferential surface zone of the film on which pictures are to be successively taken, a bearing in the front wall into which an axial key projection on the film disk projects; and a camera having a front component and a separable rear component into which latter the magazine fits, a lens in line with the exposure opening, a lens shutter, a spindle journaled in a bearing in the front component connecting automatically with the key projection of the film disk as the camera is closed, and a knob on the spindle whereby the film disk can be rotatively shifted from the exterior of the camera for presentation of different portions of its circumferential zone at the exposure opening.

10. The combination of a film magazine and a camera according to claim 9, wherein an indicator finger on the spindle cooperates with an index dial on the camera casing to indicate successive positions of the film disk.

11. The combination of a film magazine and a camera according to claim 9, wherein a spring indicator finger with a spoon end cooperates with holes arranged in an annular series in an index dial on the camera casing to yieldingly hold the film disk in successive positions.

12. The combination of a film magazine and a camera according to claim 9, wherein the magazine is provided with a shiftable closure which normally covers the exposure opening; wherein a shield covers a slot in the front component of the camera casing; wherein a pin carried by the shield automatically engages the closure of the magazine as the camera casing is being shut; and wherein the pin passes outward through the slot in the front camera component for convenience of manipulation to enable shifting of the magazine closure and uncovering of the exposure opening from the exterior of the camera.

13. The combination of a film magazine and a camera according to claim 9, wherein the magazine is provided with a shiftable closure which normally covers the exposure opening; wherein a shield in the form of a sector shield fulcrum on the spindle bearing covers a slot in the front component of the camera casing; wherein a pin carried by the sector automatically engages the closure of the magazine as the camera is being closed; and wherein the pin passes outward through the slot in the front camera component for convenience of manipulation to enable shifting of the magazine closure and uncovering of the exposure opening from the exterior of the camera.

14. The combination of a film magazine and a camera according to claim 9, wherein the magazine is provided with a shiftable closure which normally covers the exposure opening; wherein a shield covers a slot in the front component of the camera casing; wherein a pin carried by the shield automatically engages the closure of the magazine as the camera casing is being shut; wherein the pin passes outward through the slot in the front camera component for convenience of manipulation to enable shifting of the magazine closure and uncovering of the exposure opening from the exterior of the camera; and wherein a projection on the rear component of the camera casing is engaged by the sector shield when the latter is moved to effect uncovering of the exposure opening to lock the two casing components against separation.

15. The combination of a film magazine and a camera according to claim 9, wherein the magazine is provided with a shiftable closure which normally covers the exposure opening; wherein a shield in the form of a sector shield fulcrum on the spindle bearing covers a slot in the front component of the camera casing; wherein a pin carried by the sector automatically engages the closure of the magazine as the camera is being closed; wherein the pin passes outward through the slot in the front camera component for convenience of manipulation to enable shifting of the magazine closure and uncovering of the exposure opening from the exterior of the camera; and wherein a projection on the rear component of the camera casing is engaged by the sector shield when the latter is moved to effect uncovering of the exposure opening, to lock the two casing components against separation.

16. A camera comprising a light-tight casing; a lens at the front of the casing; a shutter slide with a lens opening confined to reciprocation crosswise of the lens; fixed end stops for limiting the movement of the slide in opposite directions; a yielding finger having a cam end which cooperates with spaced notches in the slide to hold it against accidental displacement in either of its two extreme positions with its opening out of registry with the lens; a shutter operating lever; and an interposed pivoted element having two flexible arms, one connected to the slide and the other to the operating lever, whereby when the lever is moved in one direction, the slide is shifted suddenly in one direction for a snap shot when sufficient power is stored in the pivoted element through flexure of its arms to overcome the frictional restraint imposed on the slide by the cam finger, and whereby when the lever is moved in the opposite direction, the slide is shifted reversely in a like manner.

17. A camera according to claim 16, including a normally retracted movable auxiliary stop member capable of being positioned to limit the shift of the shutter slide in one direction and thereby determine registry of its opening with the lens for the purpose of time exposures.

18. A camera comprising a light-tight casing; a lens at the front of the casing; a shutter slide with a lens opening therein movable in opposite directions crosswise of the lens; means for operating the shutter slide; and a member with apertures of different areas capable of being shifted for selective registry of its apertures with the lens, said member having a spring finger adapted to yieldingly engage index stops at the front of the camera casing.

19. A camera according to claim 18, wherein the aperture member is pivoted on the camera casing and has its apertures arranged in an arc concentric with the pivot and intersecting the lens axis.

JAMES J. DILKS, Jr.